Nov. 6, 1934.  C. W. GANNETT  1,979,378
CASTER
Filed May 29, 1931   2 Sheets-Sheet 1
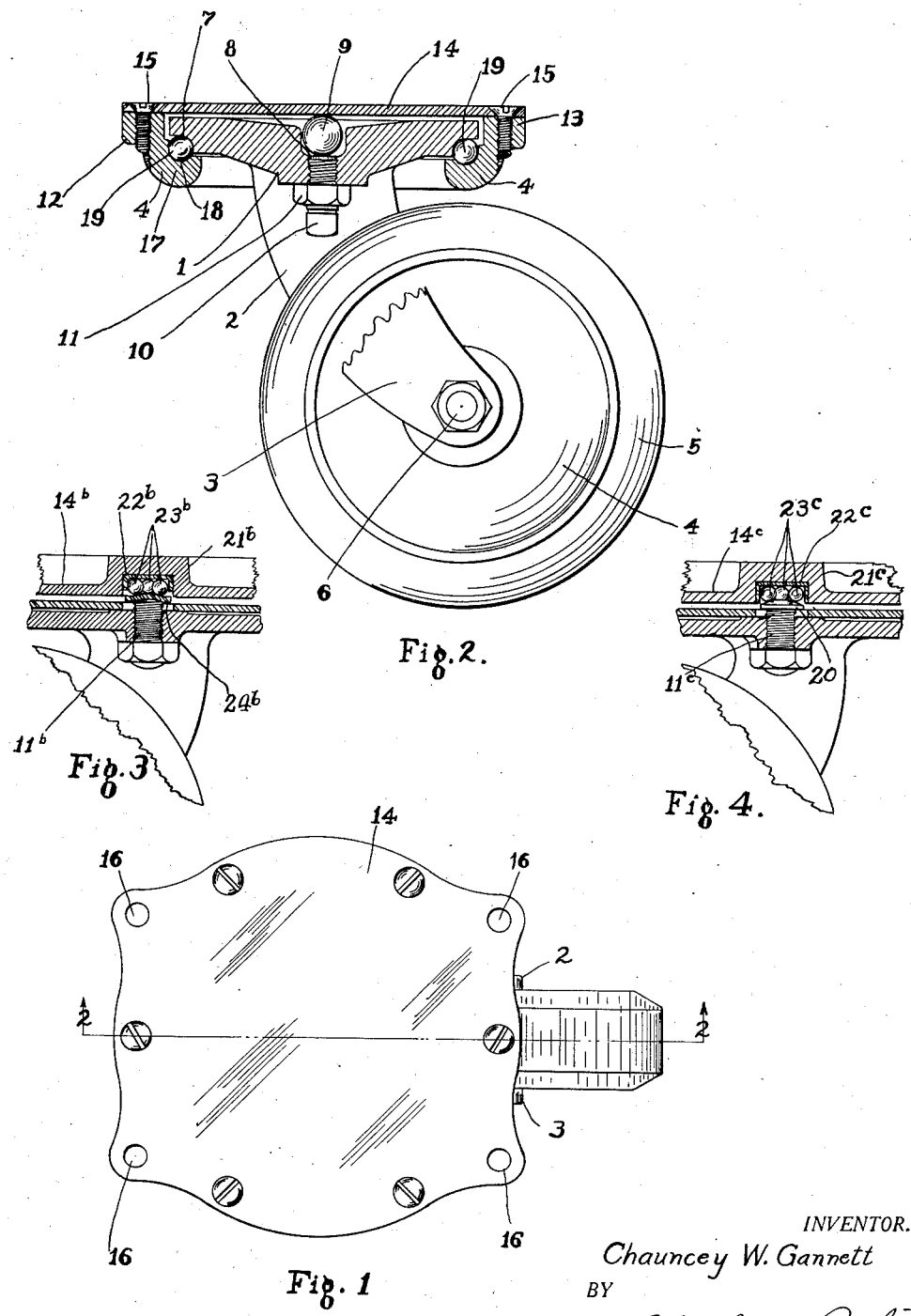
INVENTOR.
Chauncey W. Gannett
BY
Slough and Canfield
ATTORNEY.

Nov. 6, 1934.  C. W. GANNETT  1,979,378
CASTER
Filed May 29, 1931   2 Sheets-Sheet 2
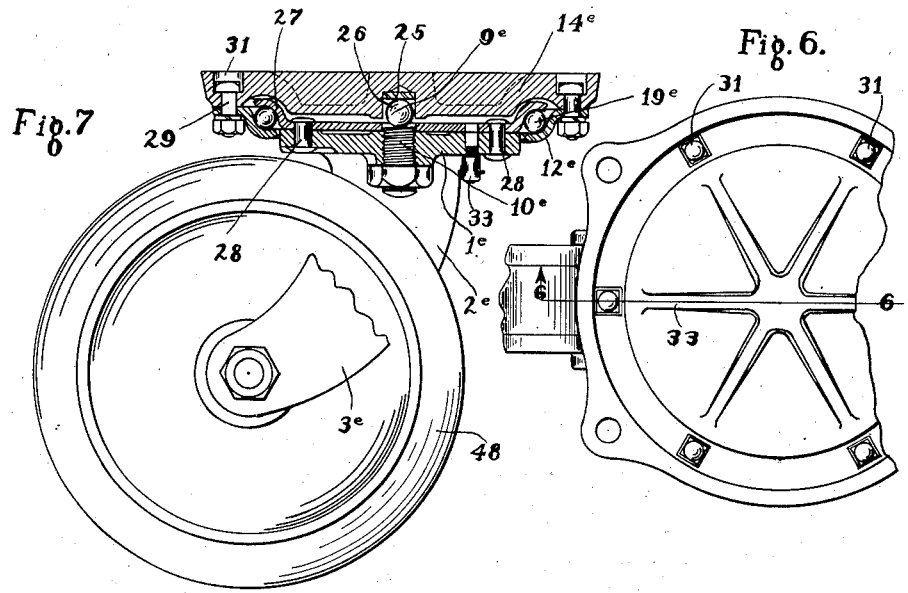
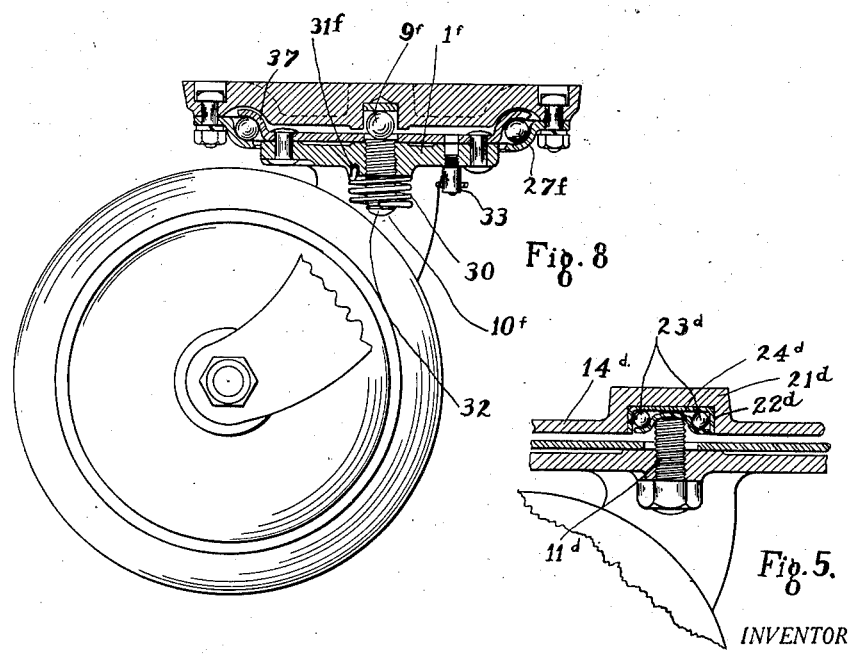
INVENTOR.
Chauncey W. Gannett.
BY
Slaugh and Caufield
ATTORNEY.

Patented Nov. 6, 1934

1,979,378

UNITED STATES PATENT OFFICE 1,979,378

CASTER

Chauncey W. Gannett, Wellington, Ohio, assignor to The Wellington Machine Company, Wellington, Ohio, a corporation of Ohio Application May 29, 1931, Serial No. 541,019

9 Claims. (Cl. 16—21)

My invention relates to casters and relates more particularly to an improved ball bearing construction for such casters.

It is an object of my invention to provide an improved caster mechanism.

Another object of my invention is to provide a caster mechanism adapted to sustain a load with a minimum resistance to the swiveling action of the caster.

Another object of my invention is to provide an improved caster having improved wear compensating means for the bearings thereof.

Another object of my invention is to provide an improved caster mechanism wherein ready adjustment of the bearing elements may be had.

Another object of my invention is to provide a caster having a minimum of parts, and which will be efficient in use, readily assembled, and economical to manufacture.

Other objects of my invention, and the invention itself, will become better understood by reference to the following description of an embodiment thereof, in which description reference will be had to the accompanying drawings forming a part of this specification, and in which drawings:

Fig. 1 is a plan view of a caster mechanism embodying my invention;

Fig. 2 is a longitudinal medial section taken on the line 2—2 of Fig. 1;

Fig. 3 is a longitudinal medial sectional view of a fragment of a caster mechanism, which is a second embodiment of my invention, this figure also illustrating the caster wheel and a fragment of a fork therefor in elevation;

Fig. 4 is a longitudinal medial sectional view of a fragment of a caster mechanism, which is a third embodiment of my invention;

Fig. 5 is a longitudinal medial sectional view of a fragment of a caster mechanism, which is a fourth embodiment of my invention;

Fig. 6 is a plan view of a caster mechanism which is a fifth embodiment of my invention;

Fig. 7 is a longitudinal medial sectional view taken on the line 6—6 of Fig. 6, the caster wheel and a fragment of a caster fork being shown in elevation therein;

Fig. 8 is a view otherwise like that of Fig. 7, but showing a sixth embodiment of my invention.

Referring now first to the first embodiment of my invention illustrated in Figs. 1 and 2, at 1 I show a caster plate in the form of a disk forming the yoke of a caster fork having parallel pendant prongs 2 and 3. A caster wheel 4 preferably supporting at its rim a rubber tire 5 is journaled on an axle 6 which is affixed by its ends to the caster forks 2 and 3, bridging the ends of said forks, whereby the wheel is rotatably mounted on said axle between the forks.

The plate 1 is provided with a peripheral annular bearing race groove 7 on its under outer edge surface and its central upper surface is provided with a bearing ball receiving socket 8 adapted to receive a relatively large bearing ball 9. A hardened bearing surface upon which the bearing ball 9 is seated while within the socket 8 is provided by the plane hardened end of a machine screw 10, which is screw-threaded upwardly through the axial wall of the socket recess 8 from between the caster forks 2 and 3, and is maintained in adjusted position in contact with the bearing ball, such as by a set nut 11.

Cooperating with the bearing race groove 7 on the yoke 1, I provide an annular bearing element 12 comprising an annular outer upper flange 13 by which the annular bearing element 12 is secured to the load supporting plate 14 by a series of screws 15 projected through border portions of said plate and said bearing element flange 13. The plate 14 is adapted to be secured to an article of furniture, a truck, body, or the like in any suitable well known manner, such as by a series of screws 16 projected through the plate 14 and into a pedestal or body portion thereof.

The annular bearing element 12 also is provided with a pendant inwardly turned flange 17 which is provided with an annular bearing race groove 18 on its inner and upper surface. A set of bearing balls 19 which are relatively much smaller than the central bearing ball 9 is interposed between the opposed bearing race grooves 7 and 18 of the yoke 1 and the annular bearing element 12 to maintain them in desired spaced relation and to make bearing engagement therewith whereby the caster yoke 1 may readily rotate with minimum friction relative to said annular bearing element 12. The yoke 1 is meanwhile maintained in the desired spaced swiveling relation relative to the plate 14 by virtue of the interposition of the relatively large bearing ball 9 between the end of the adjustable bearing screw 10, and the under central portion of the surface of the plate 14.

The screw 10 may be readjusted from time to time to compensate for wear by and of the bearing balls 9 and 19 with respect to the thereby contacted bearing surfaces of the caster mechanism. With the plate 14 and/or the annular bearing element 12 secured to an article forming the load for the caster and supporting said load, it is apparent that the bearing ball 9 will withstand vertical thrust transmitted from the load to the wheel and that the bearing balls 19 will be required to take care of any resultant thrusts imposed in any and all directions angular to the vertical swiveling axis of the caster, in which axis the single load supporting ball 9 is located.

The bearing balls 19 prevent undue separation of the yoke 1 from the plate 14 and maintain the lateral supports for said caster in a manner easily to be understood from the foregoing.

The embodiments illustrated in Figs. 3, 4 and 5 illustrate modifications of my design involving structural departures from the single ball idea of supporting the load, but still achieve the advantages thereof in a similar manner. In these embodiments the ends of the adjustable screws 11b, 11c, 11d are convexly rounded, the ends of the screws 11b, and 11d being substantially alike, though preferably rounded to slightly different degrees, and in the said third embodiment the end of the screw 11c comprises a peripherally enlarged tip 20 having an upper concavely-convex surface and is preferably of larger diameter than the stem of the screw.

In each of the said embodiments I preferably provide the top load supporting plates 14b, 14c, 14d with a central upstanding boss 21b, 21c, 21d each boss being centrally recessed on its underside and the recesses are preferably lined with small metallic facing cups 22b, 22c, 22d tightly fitted therein in inverted position. In the said third embodiment of Fig. 4, a plurality of small bearing balls 23c preferably more than two in number are interposed between the inner surfaces of the facing cup 22c and because of the convex form of the opposing surface of the screw tip 20, the balls are crowded to the interior corner portions of the facing cup to form a set of bearing balls annularly disposed within the cup and directly engaging the rounded tip 20 of the screw 11c.

In my said second and fourth embodiments illustrated in Figs. 3 and 5, respectively, the sets of bearing balls 23b and 23d are interposed between the interior portions of the cup facings 22b or 22d and dished discs 24b or 24d on the rounded ends of the screws 11b or 11d.

In each case, the convex form of the screw tips insures that the upper load supporting plate may, except for the restraint exercised by the bearing balls corresponding to those shown at 19, Fig. 1, freely oscillate about the center of curvature of said screw tips in lateral directions, according to the amount of play permitted by the fit of the bearing balls of the caster mechanism against their bearing surfaces.

This play or fit is capable of being adjustably predetermined by the adjustment of the screw 10, 11b, 11c and 11d as the case may be.

Referring now to the fifth embodiment of my invention illustrated in Figs. 6 and 7, a single load supporting ball 9e is interposed between the bearing end of the adjustable screw 10e and a small disk shaped bearing liner 25, which has been press-fitted into the central lower recess 26 of the load supporting plate 14e, to provide a hardened bearing surface for the end wall of the recess. The recess 26 provided in the plate 14e eliminates the necessity of a race such as that shown at 8, Fig. 1, in the caster yoke, since the ball 9e can be caged within a recess in either the caster yoke or the load supporting plate.

In my said fifth embodiment I also provide a sheet metal stamping 12e secured by its peripheral flange by bolts 29 to the border portion of the load supporting plate 14e, in the place of the annular bearing element 12, as illustrated in Fig. 1, and cooperating therewith to form an opposing bearing race therefor, I provide a sheet metal disk 27 secured to the top of the yoke 1e by a series of rivets 28, the bearing element 12e and the sheet metal disk 27 having opposing superposed annular curved flanges forming opposing bearing races for the set of bearing balls 19e in substantially the same manner as do the races provided by the yoke 1 and bearing element 12 in my said first embodiment. I also contemplate variations of the constructions shown in Figs. 6 and 7, wherein the sheet metal disk 27 is made integral with the pendant caster forks 2e and 3e.

Referring now to the sixth embodiment of my invention illustrated in Fig. 8, I illustrate therein a resilient means for maintaining the proper adjustment of the adjustable bearing screw 10f comprising a helical wire spring 30 telescoped over the lower end of the screw with its upper end rigidly affixed at 31f to the caster yoke 1f and its lower end rigidly secured at 32 to the end of said screw.

In placing the spring 30 in the position described, the spring is in substance wrapped about the screw more closely than the normal form of the spring would tend to effect, whereby due to the inherent resiliency of the spring attempting to retract to its normal larger diameter will tend to rotate the screw 10f to advance it upwardly against the bearing ball 9f.

The strength of the spring is insufficient to cause too great an axial pressure of the screw against the bearing ball, but is sufficient to advance the screw to take up for all undue looseness of the bearing automatically and without any personal attention and thereby compensates for wear of the bearing.

Wherever desired lubricant receiving nipples, such as those shown at 33 in Figs. 7 and 8 may be employed to admit lubricant to the central and annular bearing ball recesses.

Having thus described my invention in a number of different embodiments, I am aware that numerous and extensive departures may be made from the embodiments herein illustrated and described, but without departing from the spirit of my invention.

I claim as my invention:—

1. In a caster construction, a load member for engaging and supporting a load, a castering member comprising a head and a depending fork and a wheel rotatable in the fork, a single load transmitting bearing ball between the head and the load member upon which they may rotate relatively on a generally vertical axis through the ball, and disposed laterally of the wheel center, a pair of coaxial raceways respectively on the load member and head, a plurality of anti-friction rolling bearing elements on the raceways, the load member tending to be rocked on the single ball relative to the head by load on the load member, and tending to move the load member and head apart at one side of the ball axis and toward each other on the opposite side, the plurality of bearing elements on the raceways opposing rocking movement, and effecting a two-point rotary bearing for the head and load member in all relatively rotated positions thereof comprising the single ball and a rolling bearing element on the raceways and the load maintaining the single ball and said raceway bearing element in pressure engagement proportional to the load.

2. A caster construction as described in claim 1 and in which adjusting means is provided to adjustably move the load member away from the head axially to take up looseness in the central ball bearing and the coaxial raceways and bearing elements.

3. A caster construction as described in claim 1 and in which the central ball between the load member and head has a permanent bearing upon one and an axially adjustable bearing upon the other.

4. A caster construction as described in claim 1 and in which the central ball between the load member and head has a permanent point of bearing on one and bears upon a surface associated with the end portion of a stud threadedly engaging the other, and the stud is adjustably movable to move the head and load member apart axially to tighten the central portion and the bearing elements in the raceway.

5. A caster construction as described in claim 1 and in which the raceway in the head is on a portion overhanging the raceway of the load member and the central ball between the load member and head engages one of the two upon an axially adjustable bearing portion which when adjusted tightens the central ball in its bearing and tightens the bearing elements in their raceways by simultaneous movement of the load member and head axially apart.

6. In a caster construction, a load member for engaging and supporting a load, a castering member comprising a head and a depending fork and a wheel rotatable in the fork, a load transmitting anti-friction bearing between the head and the load member upon which they may rotate relatively on a substantially vertical axis disposed laterally of the wheel center, and upon which the load member may tend to rock universally relative to the head, a pair of coaxial raceways respectively on the load member and head, a plurality of rolling bearing elements on the raceways, and resisting tendency of the head and load member to rock relatively on the central bearing, the said load transmitting bearing comprising an axially adjustable bearing element and a relatively stationary bearing element, one on the head and the other on the load member for adjustably taking up looseness in the load transmitting bearing and the coaxial raceways.

7. A caster construction as described in claim 6 and in which the load transmitting bearing is of the single ball type and the axially adjustable bearing element is a threaded stud and the ball has bearing upon a surface associated with the end portion of the stud.

8. In a caster construction, a load member for engaging and supporting a load, a castering member comprising a head and a depending fork and a wheel rotatable in the fork, a load transmitting anti-friction bearing between the head and the load member upon which they may rotate relatively on a substantially vertical axis disposed laterally of the wheel center, and upon which the load member may tend to rock universally relative to the head, a pair of coaxial raceways respectively on the load member and head, a plurality of rolling bearing elements on the raceways, and resisting tendency of the head and load member to rock on the central bearing, the raceway on the load member underhanging the raceway on the head and supporting the lower portion of the rolling bearing elements, the said load transmitting bearing comprising a bearing element and a threaded stud having a bearing surface associated with an end thereof, the bearing element and the stud being disposed one on the head and the other on the load member for adjustably taking up looseness in the load transmitting bearing and the coaxial raceways, and a circular series of rolling elements between the stud bearing surface and the said bearing element.

9. In a caster construction, a load member for engaging and supporting a load, a castering member comprising a head and a depending fork and a wheel rotatable in the fork, a load transmitting anti-friction bearing between the head and the load member upon which they may rotate relatively on a generally vertical axis through the bearing, and disposed laterally of the wheel center, a pair of coaxial raceways respectively on the load member and head, a plurality of anti-friction rolling bearing elements on the raceways, the load member tending to be rocked on the anti-friction load transmitting bearing relative to the head by a load on the load member, and tending to move the load member and head apart at one side of the load transmitting bearing axis and toward each other on the opposite side, the plurality of bearing elements on the raceways opposing rocking movement, and effecting a two-point rotary bearing for the head and load member in all relatively rotated positions thereof comprising the said anti-friction load transmitting bearing, and a rolling bearing element on the raceways and the load maintaining the load transmitting bearing and said raceway bearing elements in pressure engagement proportional to the load.

CHAUNCEY W. GANNETT.